July 27, 1926.  1,593,559
G. A. ARNOLD
AUTOMOBILE VISOR
Filed April 16, 1925   2 Sheets-Sheet 1
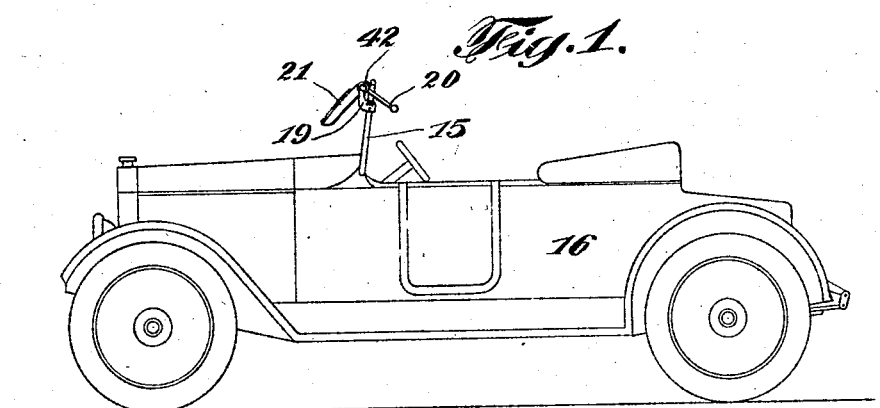
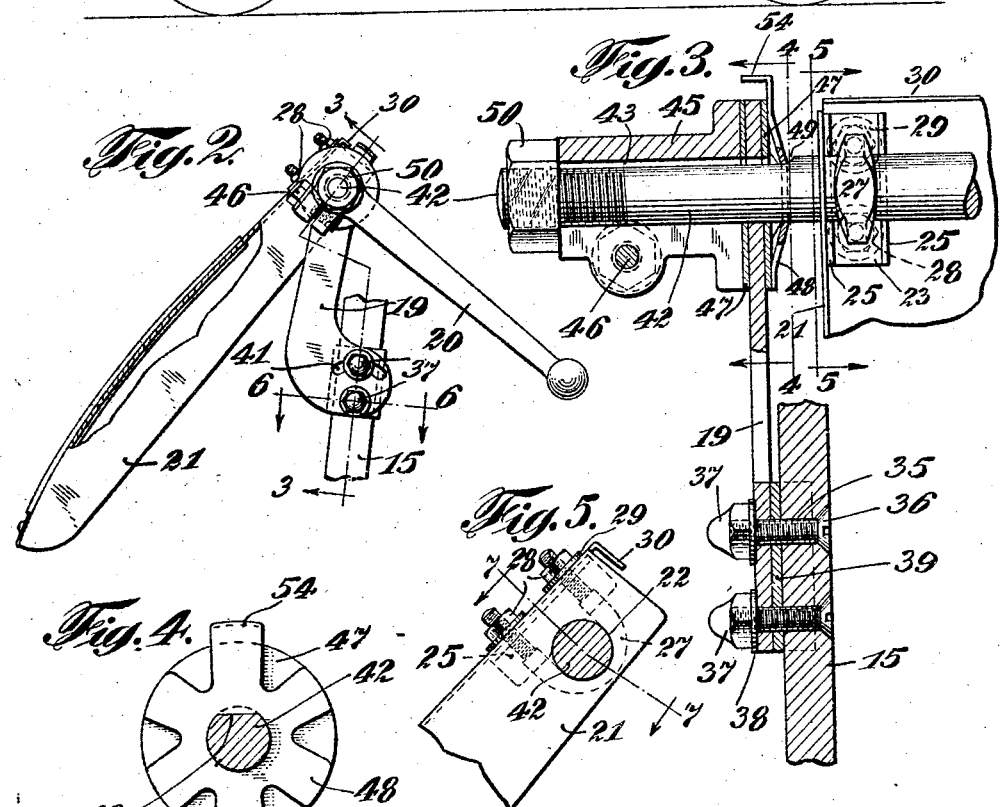
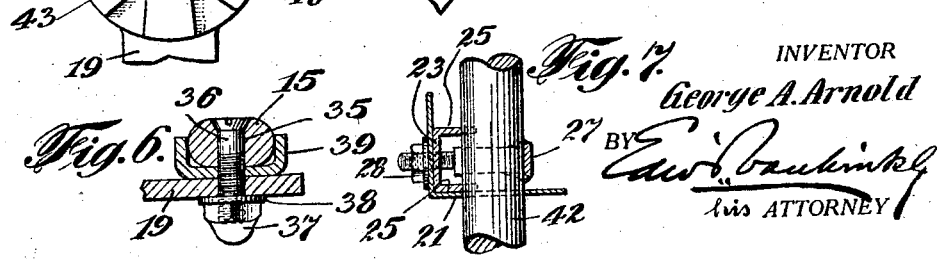
INVENTOR
George A. Arnold
BY
his ATTORNEY July 27, 1926.
G. A. ARNOLD
1,593,559
AUTOMOBILE VISOR
Filed April 16, 1925          2 Sheets-Sheet 2
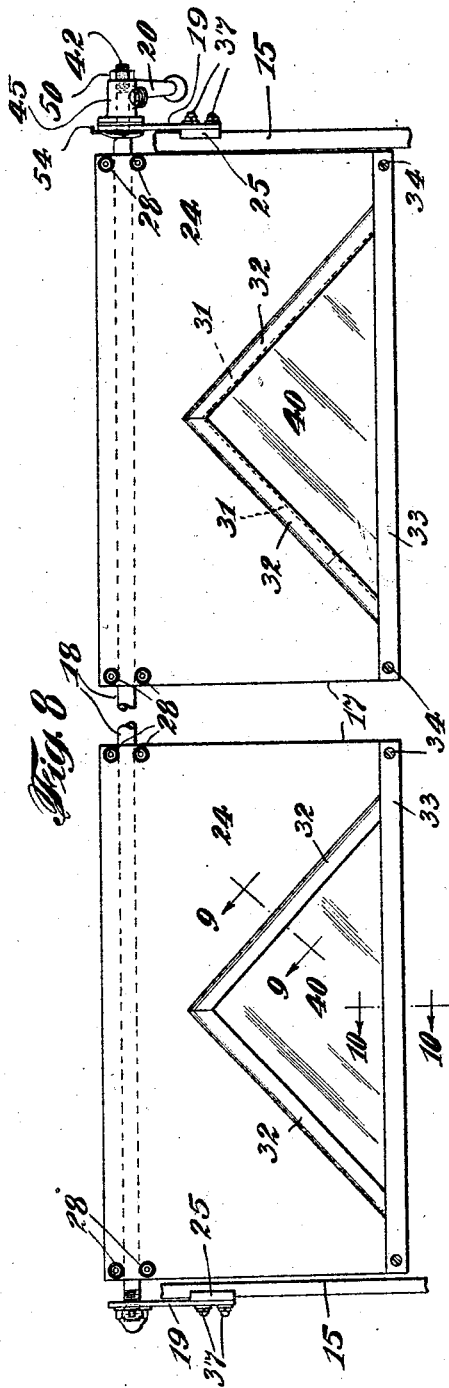
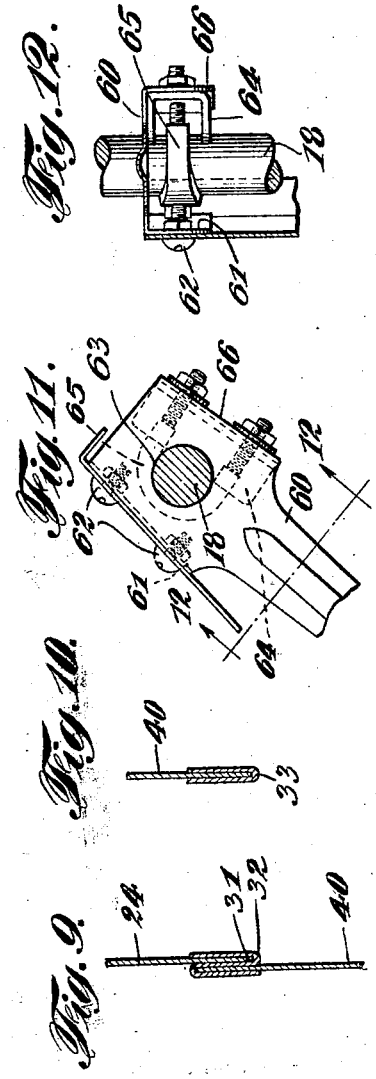
INVENTOR
George A. Arnold
BY
his ATTORNEY Patented July 27, 1926.

1,593,559

UNITED STATES PATENT OFFICE.

GEORGE A. ARNOLD, OF NEWARK, NEW JERSEY, ASSIGNOR TO SUBURBAN TRANSIT COMPANY, OF PLAINFIELD, NEW JERSEY, A CORPORATION OF NEW JERSEY.

AUTOMOBILE VISOR.

Application filed April 16, 1925. Serial No. 23,666.

This invention relates to improvements in automobile visors, particularly to a visor which will shield the eyes of a driver from the blinding glare of the headlights of approaching cars. The visor is designed to serve the additional purpose of protecting the upper portion of a windshield from rain and snow.

The invention involves certain improvements on the type of visor shown and described in my copending application, Serial No. 617,664, filed February 8, 1923.

Among the main objects of the invention are to so simplify the construction of the device as to lessen production costs, to strengthen the parts and at the same time reduce weight, to simplify the manner of its attachment to the vehicle, and render it more attractive in appearance, and more durable in use.

Specific objects are to provide improved means for attaching the visor to a windshield frame, and means for readily replacing the translucent section and forming a visor embodying various unique and advantageous structural features.

With these and other objects in view, the invention consists in certain features of construction and combinations and arrangements of parts as will be more fully described hereinafter and pointed out in the claims.

In the accompanying drawings:

Fig. 1 is a side elevation of an automobile illustrating the manner of use of my improved visor.

Fig. 2 is an end view of the device attached to a windshield stanchion, parts being broken away and in section, for clearness.

Fig. 3 is an enlarged sectional view on the staggered line 3—3 of Fig. 2.

Figs. 4 and 5 are transverse sections on the lines 4—4 and 5—5 respectively of Fig. 3.

Fig. 6 is a sectional detail on the line 6—6 of Fig. 2.

Fig. 7 is a sectional detail on the line 7—7 of Fig. 5.

Fig. 8 is a top plan view of the visor.

Figs. 9 and 10 are transverse sections on the lines 9—9 and 10—10 respectively of Fig. 9.

Figs. 11 and 12 are detail views illustrating a slightly modified form of construction, Fig. 12 being taken on the line 12—12 of Fig. 11.

My improved device is illustrated as attached to the windshield stanchions 15 of an automobile 16, although as to certain important features of my invention other methods or means of attachment may be employed and the parts may be secured to any appropriate part of the vehicle frame.

My improved visor includes a pair of sections or panels 17, 17, fixed to a common shaft 18 which is journaled transversely of the windshield in brackets 19. A suitable operating handle 20 is provided for manually rocking the shaft 18 to simultaneously tilt the vizor panels.

Each visor section comprises a plate 24 of opaque material, preferably metal, slightly bowed transversely of its length and formed with turned down flanges 21 at opposite ends having openings 22 therein near the upper portion of the visor to accommodate the shaft 18. (Fig. 5). To secure the panels to the shaft 18 I employ channelled members 23 (Figs. 3 and 5) including intermediate portions held flat against the under side of the panel 24 and flanges 25 recessed to accommodate the shaft 18. The channelled members are held firmly against the panel and the panels are locked to the shaft by U-bolts 27 which straddle the shaft and have their threaded extremities passed through the parts 24 and 23 and secured by nuts 28 and washers 29. Obviously other suitable means might be provided for securing the plates to the shaft 18, but I find the construction described very rigid and satisfactory. Furthermore, the nuts 28 are readily accessible for the purpose of tightening a loose connection. The panels may be additionally strengthened by turning over a flange 30 at their upper edges.

The lower outer edge of each panel 24 is formed with a notch or cutaway portion 31, to receive a similarly shaped sheet 40 of translucent anti-glare material, such for instance as suitably colored celluloid. This sheet may be substantially triangular and conveniently framed within this cutaway portion of the plate. To secure the translucent material in place I employ a pair of frame bars 32, 32 (Figs. 8 and 9) which are of substantially Z-shape in cross-section, and consequently provide both plate engaging and sheet receiving portions. These frame bars are fitted over the edges of the cutaway portion of the plate 24, and the sheet 40 is slipped into place. An additional frame bar 33 U-shaped in cross-section is secured upon the free edge of the plate. Any suitable securing devices such as the screws 34 may serve this purpose. It will be noted that the frame bar 33 holds both the frame bars 32 and the sheet 40 in place. A rigid triangular frame is thus provided for the sheet 40 so that the sheet has little tendency to buckle or warp. The use of large sheets of flexible translucent material is eliminated entirely, with the consequent inconvenience of breaking, cracking and warping incident to the use of the large sheets. With the construction herein shown, breakage of a sheet causes no serious inconvenience since a damaged sheet may be readily removed and a new one substituted without removing the visor.

In attaching the supporting brackets 19 for the shaft 18 to the windshield frame stanchions 15, I preferably dispense with the use of special clamps or holders. The stanchions 15 are drilled or tapped to provide openings 35 for screws 36 (Figs. 3 and 6). These screws pass through the lower ends of the brackets 19 and cooperate with nuts and washers 37, 38, to effect attachment of the brackets to the stanchions. A firmer connection may be had by interposing U-shaped spacers 39 between the brackets and frame, the flat intermediate portion of the spacers lying flatly against the brackets and the legs of the spacers straddling the stanchions. A pair of screws 36 arranged one above the other are used with each bracket and the brackets are formed with curved slots 41 therein to accommodate one of the screws. This permits the brackets 19 to be swung and locked at any desired angle relative to the windshield stanchions, the lower screws 36 serving as pivots about which the brackets are adjusted.

That end of the shaft 18 which is on the driver's side of a car is formed with an extension 42 flattened on one side as at 43 and provided with a screw-threaded extremity 44. The operating handle 20 is secured to this extension, the handle being integral with a split collar 45 encircling the extension and carrying a tightening screw 46. As the screw 46 is tightened the extension 42 of the shaft 18 is firmly clamped by the split bearing 45 and the handle 20 consequently is rigidly coupled to the shaft. Friction washers 47 are arranged on the extension 42 at opposite sides of the bracket 19. A star shaped spring 48 is interposed between one washer and a shoulder 49 (Fig. 3) at the end of the flattened portion 43 of the shaft extension 42. An adjusting nut 50 on the threaded end of the extension holds the split bearing 45 snugly against the other washer 47. The spring 48 has a central opening therein shaped to fit the flattened end of the extension 42 so that the spring turns with the shaft 18. Before tightening the split bearing 45 the nut 50 is adjusted to develop the desired friction between the spring 48 and its adjacent friction washer. Sufficient friction is maintained to retain the visor at any angle to which it may be tilted by an operator and at the same time not interfere with its expeditious and facile operation.

The shaft 18 and handle 20 may tend to turn with the nut 50 as it is tightened and having this in mind I extend and upset one of the radial arms of the star shaped spring 48. A handhold 54 is thus provided to prevent tilting of the visor upon attempted adjustment of the nut 50.

The visor will always protect the upper portion of a windshield in wet weather. When driving at night the visor may be either permanently adjusted so that the translucent sheets of material protect the driver's eyes from headlight glare, or may be temporarily tilted to operative position upon the approach of another car. The two visor sections afford protection for a passenger in the front seat as well as the driver, and incidentally adapt the visor for use with a car having either a right or left hand drive.

With the modified form of visor unit shown in Figs. 11 and 12, the side flanges 41 of the plates 24 are eliminated and ribbed metallic arms 60 are substituted. These arms include ears 61 to which the side edges of the panels are fastened by securing devices 62. The rear upper ends of the arms are provided with openings 63 for the accommodation of the shaft 18. Instead of attaching the plates directly to the shaft angular extensions 66 are provided on the arms 60. Channelled members 64 are interposed between these extensions and the shaft 18, and U-bolts 65 straddling the shaft have their extremities projecting through and secured to the extensions.

While I have illustrated two of the preferred embodiments of the invention, numerous changes might be made in the general form and arrangement of the parts described, without departing from the invention, and hence I do not limit myself to the details set forth, but shall consider myself at liberty to make such changes and alterations as fairly fall within the spirit and scope of the appended claims.

Having thus described my invention, what I claim as new and desire to secure by Letters Patent is:

1. An opaque visor having a cutaway portion in its free edge, a translucent member, channelled frame bars engaging the edges of said cutaway portion and said translucent member, and means for holding said translucent member in place within the frame bars.

2. An opaque visor having a cutaway portion in its free edge, a translucent member, channelled frame bars engaging the edges of said cutaway portion and said translucent member, and means for holding said translucent member in place within the frame bars, said means comprising another channel bar receiving the free edge of the visor and engaging the translucent member.

3. An opaque visor having a substantially triangular cutaway portion in its free edge, and a substantially triangular sheet of translucent material removably secured within said opening.

4. A windshield visor including a sheet metal plate having downturned end flanges each provided with an opening adjacent to one edge and at the end of said flanges, a rod extending through said openings, and U-bolts encircling said rods adjacent to said flanges, and having the ends extending through the visor to the upper surface.

Signed at Newark in the county of Essex and State of New Jersey this fifteenth day of April A. D. 1925.

GEORGE A. ARNOLD.